Figure 1:
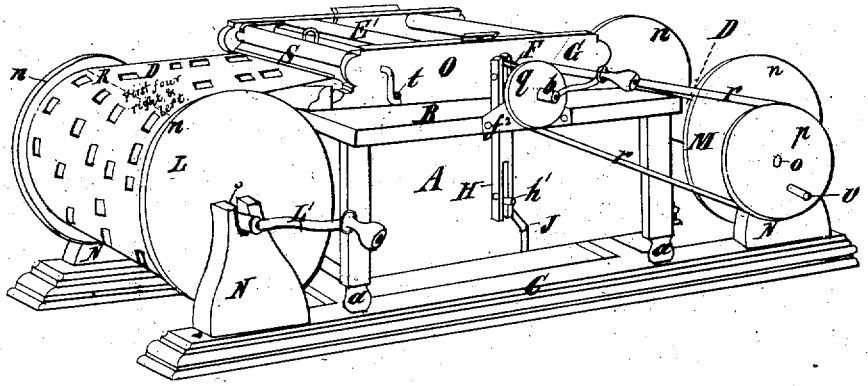

2 Sheets—Sheet 1.

G. B. KELLY & M. J. MATTHEWS,

Assignors, by mesne assignments, to M. J. MATTHEWS, J. MORGAN & J. NICHOL.

Mechanical Musical Instrument.

No. 9,532. Reissued Jan. 11, 1881.

*Witnesses:*
Thomas E. Birch.
Geo. H. Haynes.

*Inventor.*
George B. Kelly
Marcus J. Matthews
by their Attorneys
Brown & Brown

2 Sheets—Sheet 2.

G. B. KELLY & M. J. MATTHEWS,

Assignors, by mesne assignments, to M. J. MATTHEWS, J. MORGAN & J. NICHOL.

Mechanical Musical Instrument.

No. 9,532. Reissued Jan. 11, 1881.

*Witnesses.*
Thomas E. Birch.
Geo. Haynes

*Inventor.*
George B. Kelly
Moses J. Matthews
by their Attorneys
Brown & Brown

UNITED STATES PATENT OFFICE.

GEORGE B. KELLY, OF BOSTON, MASS., AND MASON J. MATTHEWS, OF NEW YORK, N. Y., ASSIGNORS, BY MESNE ASSIGNMENTS, TO MASON J. MATTHEWS, OF NEW YORK, JAMES MORGAN, OF BROOKLYN, AND JOHN NICHOL, OF NEW YORK, N. Y.

MECHANICAL MUSICAL INSTRUMENT.

SPECIFICATION forming part of Reissued Letters Patent No. 9,532, dated January 11, 1881.

Original No. 217,798, dated July 22, 1879. Application for reissue filed August 4, 1880.

*To all whom it may concern:*

Be it known that we, GEORGE B. KELLY, of Boston, in the county of Suffolk and State of Massachusetts, and MASON J. MATTHEWS, formerly of Boston, in the county of Suffolk and State of Massachusetts, but now of the city, county, and State of New York, have invented certain new and useful Improvements in Mechanical Musical Instruments, of which the following is a specification.

This invention consists in the combination, with a mechanical musical instrument comprising a traveling music-sheet, of a music-roller and a take-up roller arranged and supported outside and opposite the ends of said instrument, in bearings unconnected with the instrument, whereby the music-sheet will be delivered and taken up close to the instrument.

It also consists in the combination, with a mechanical musical instrument comprising a traveling music-sheet, of an attachment provided with a music-roller and a take-up roller, between which the said instrument is supported, the said instrument being readily removable from said attachment.

It also consists in the combination, with a mechanical musical instrument, of a music-sheet controlling its operation, a music-roller and a take-up roller arranged opposite each other outside the case of said instrument, a driving-shaft, and means through which said take-up roller is operated from said shaft.

It also consists in a stand having standards at each end, and an intermediate space adapted to receive the instrument in such position that a strip of paper may pass from a reel on one pair of said standards and connect with a reel on the other pair of standards.

It also consists in the combination, in a mechanical musical instrument, of sound-producing devices, bellows for operating the same, a music-sheet for controlling their operation, a feed-roller for imparting motion to the music-sheet, a shaft with cranks set at different angles connected to the bellows, and pitman-rods preferably passing through slots in the top board of the instrument and connecting the feed-roller with the said shaft at each end of said shaft.

It also consists in the combination, in a mechanical musical instrument, of sound-producing devices, bellows for operating the same, a music-sheet for controlling their operation, a feed-roller imparting motion to the music-sheet, a shaft connected to the bellows, a pitman-rod extending through a slot in the top board of the instrument, connecting the feed-roller with said shaft, and a bearing for said feed-roller outside the said slot.

It also consists in the combination, with the driving-shaft, of the feed or draw rollers of a mechanical musical instrument in which a strip of perforated paper is used, one or more pitman-rods connected to a crank or cranks on said shaft, a secondary rotary shaft connected by cranks with said pitman-rods and provided with crank-bends connected by suitable links or pitmen with all the exhausters of the bellows of the instrument.

It also consists in a strip of paper having perforations arranged so as to represent a quadrille, lancers, &c., having marked or printed thereon the calls or figures belonging to said quadrille, lancers, &c., at the proper places for the same to be called when said strip of paper has a mark or line, &c., in combination with an indicator located on a mechanical musical instrument.

In the accompanying plates of drawings the present invention is illustrated.

Figure 2:
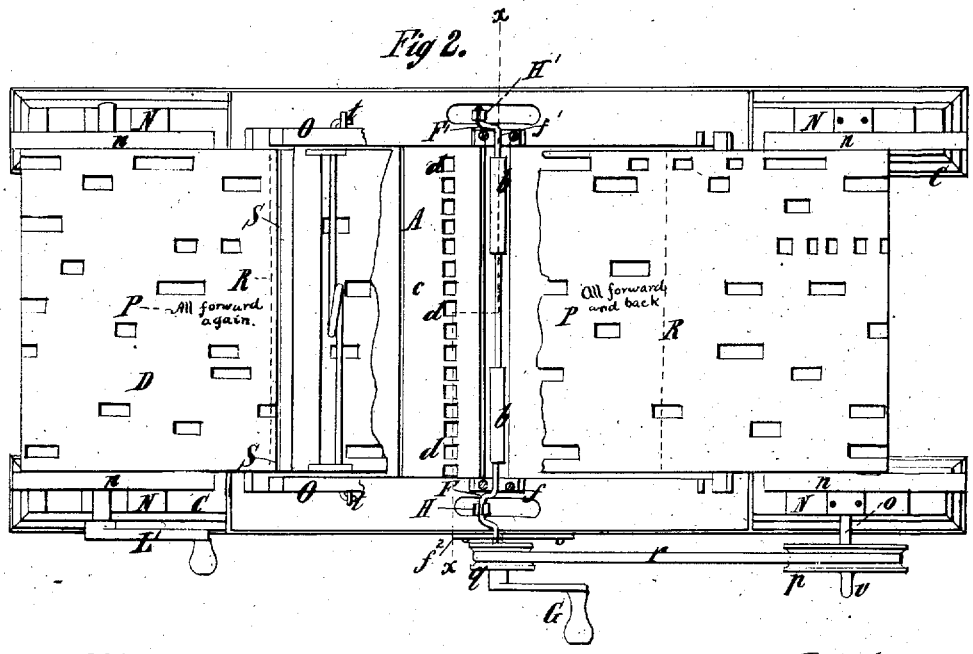
Figure 4:
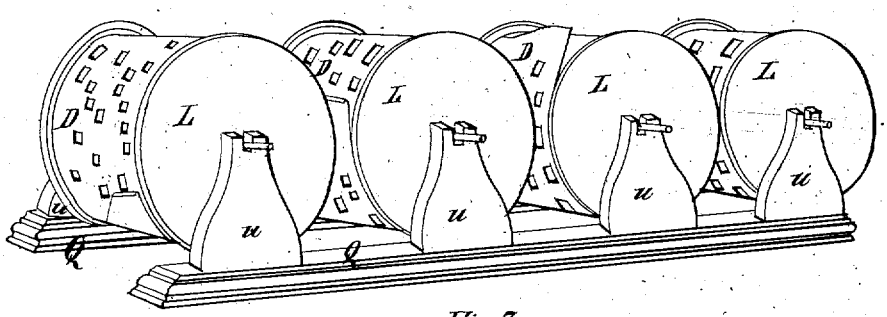
Figure 3:
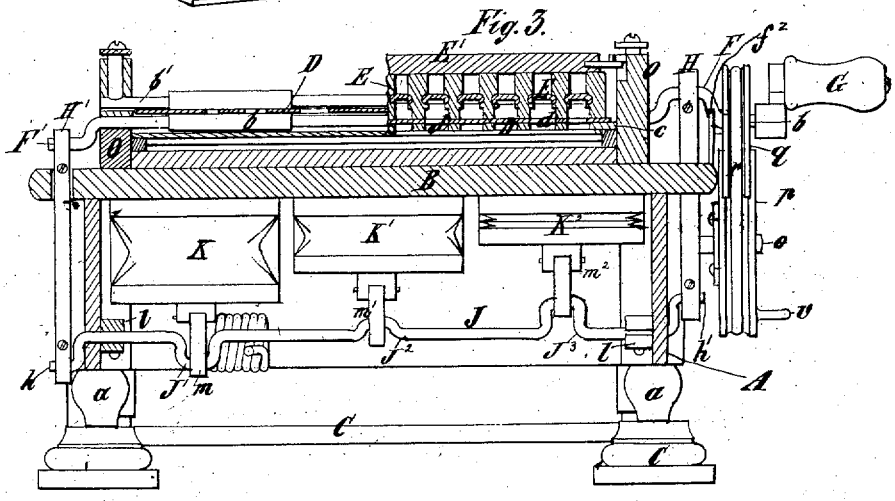
Figure 5:
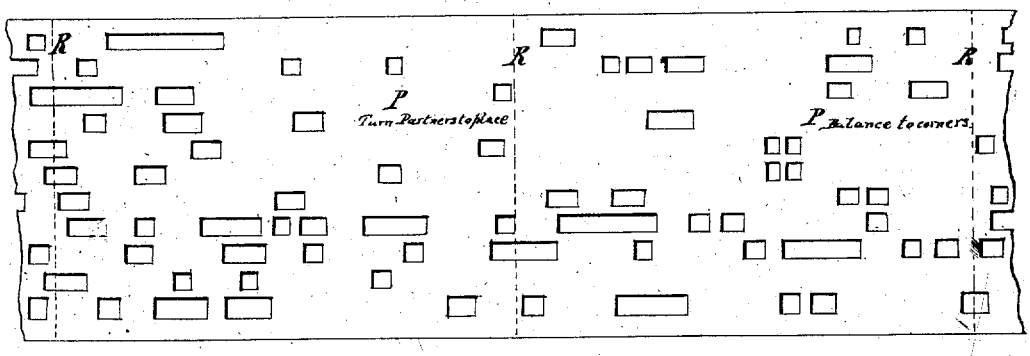

In Plate 1, Figure 1 is a view, in perspective, of a mechanical musical instrument located on a stand with two rollers for the paper-sheet arranged on the same, and the whole ready for operation. Fig. 2 is a plan view of the instrument, the stand, and the rollers, a portion of the frame above the instrument and the reed-chest being removed. In Plate 2, Fig. 3 represents a vertical cross-section of the instrument and stand on line *x x*, Fig. 2. Fig. 4 represents the stand for holding extra rollers, in the present instance showing four rollers supplied with strips of perforated paper. Fig. 5 shows a plan view of a strip of paper having perforations therein, and showing two calls and the marks belonging thereto located thereon.

In the drawings, A designates the case or box of a mechanical musical instrument, comprising sound-producing devices, or reeds, bellows, &c., and mechanism to operate the same, having a traveling music-sheet, (here shown as consisting of a strip of paper,) on which is arranged, by perforations, the tune to be played on the instrument, said instrument being of the kind known to the trade and to the public under the name of the "orguinette," and needing no more particular description herein except as to those parts to which it is necessary to refer in describing the present invention. The case A of the instrument rests, by its feet *a a*, in sockets on a frame, C, in such a manner that it can be readily and easily attached to and detached from said frame at pleasure.

*b b'* are two feed or draw rolls or rollers. They pull or draw the music-sheet or strip of perforated paper D between the reed-chest E' and board or rest *c* of the instrument. In the board *c* are air-passages *d*, leading to the bellows in the usual manner of such instruments, and the music-sheet controls the communication between these air-passages and other air-passages in the reed-chest leading to the reeds, and thus governs the operation of the reeds. The lower one, *b*, of these feed or draw rollers extends at each end beyond its mainsprings *f f'*, and has at or near each end a crank-arm, F and F', said roller being operated by the crank-arm G, beyond an outer bearing, $f^2$.

Connected to the crank-arms F F', respectively, are vertical pitman-rods H H', one on each side of the case or box A, which, at their other ends, are connected to crank-arms *h h'*, at the ends of another shaft, J, arranged horizontally below said driving-shaft, and adapted to turn in suitable bearings *l* in the case or box A. This shaft J has three other crank-arms, $J'$ $J^2$ $J^3$, set at different angles, and relatively arranged on it to connect, by links *m* $m'$ $m^2$, with the exhaust-bellows K $K'$ $K^2$, as shown in Fig. 3 more particularly. The roller *b* thus constitutes a driving-shaft, and it will be observed that the pitman-rods H H' pass through slots in the top board, B, of the case A.

The crank-arms on roller or driving-shaft *b* and the crank-arms *h h'* on the shaft J are so arranged relatively to each other that the turning of the roller or driving-shaft will, through the pitman-rod connections, turn the shaft J, and thus, through the link-connection, operate the exhaust-bellows properly for the sounding of the reeds, the several crank-arms being also arranged so as to relieve the dead-center.

The links *m* $m'$ $m^2$, by one of their ends, turn on their respective crank-arms on shaft J, and by their other ends are hinged, respectively, to the exhaust-bellows, and each link is made of two pieces, secured together in its middle by a screw, to facilitate its connection with the shaft and bellows-exhausters.

L M are two rollers provided with disks *n* on their ends, and adapted by journals to freely turn in standards or uprights N of the frame C, which are unconnected with the instrument.

Attached to one of the journals *o* of the roller M is a pulley, *p*, which is connected to another pulley, *q*, on the driving shaft or roller *b* by a belt, *r*, so that turning the driving-shaft *b* will, through the belt-and-pulley connection, turn the roller M. This roller M is shown as permanently attached to the frame; but the roller L, on the other end of the frame, merely has its journals supported in the open slots *s* in the standards N, so that when desired it can be easily removed and another roller inserted.

The strip of paper D, on which is arranged the tune, &c., to be played, is first wound upon the roller L, and removing the frame O, to which is attached the reed-chest E' and upper feed-roller, *b'*, by unhooking it at *t*, the end of the music-sheet D is then passed over the rest *c* of the case A, to and connected with the roller M of the frame C, and then having put back the frame O and secured it by its hook *t* in place, the instrument is ready for operation.

By turning the crank-arm G the feed-rollers *b b'* are made to feed or draw the music-sheet along. At the same time, by the belt-and-pulley connection with the roller M, the music-sheet is wound up on said roller, and by the pitman-rods and shaft J connected with the exhaust-bellows, and when a perforation in the music-sheet passes over a corresponding air-passage, *d*, the reed above said passage will be sounded, and thus whatever tune is arranged by the perforations on the strip of paper will be played. When the music-sheet has been entirely wound up on the roller M, and it is desired to play the tune, or any part thereof, over again, or if more than one tune is arranged on said strip, and it is desired to play any one of the intermediate tunes, the music-sheet can be easily rewound upon the roller L by its crank-arm L', as desired; or, the whole length being removed, the roller L can be removed and another roller having another music-sheet can be put in its place on the standard, and thus new tunes be played. The stand C and the rollers L M may be regarded as an attachment for the musical instrument. The rollers serve also for a convenient means of holding the strips of paper and keeping them in proper condition when not in use, and in Fig. 4 is represented a stand, Q, having uprights *u*, in which can be placed the rollers when not in use on the instrument.

The perforations in the music-sheet, in the present instance, represent a quadrille called the "Lancers," and printed on said strip are the various calls or figures P, in their regular order for such dance, and also the marks (in the present instance transverse lines R) which indicate when the call is to be made. These marks are so arranged that in moving the music-sheet when the instrument is played they pass under the bar or indicator S on the frame O, and just as such mark is to or does disappear under said bar the call next to and at the left of it is to be called, and by this simple means of indicating when the call is to be called any person, however ignorant of such matters can easily and properly give the right call at the proper time in the dance.

The indicator S is located on the frame O at such a distance from the air-passages leading to the reeds as will give a sufficient time for the call on the paper to be called for the dancers to commence the figures in the dance at the proper time with the music, the marks on the strip of paper being arranged to correspond with such distance.

The frame C, supporting the rollers L and M, can be made permanent with the instrument, or the instrument can be arranged to be attached and detached at pleasure, substantially as described; and in lieu of a separate frame to hold the rollers, the reed-chest frame O can be extended at each end and adapted to receive and hold them in substantially the same manner; and also any designating-mark can be used on the paper strip for the call, and the bar or indicator changed as to its distance from the air-passage of the reeds, as desired, or located on the case A anywhere, making, however, a corresponding relative change of the mark on the paper; and also the present invention can be applied and connected to mechanical musical instruments in which a music-sheet is used to operate valves, or reeds, or levers, or other mechanism connecting with said valves, and the music-sheet can be of any suitable material other than paper, although paper is preferable, and the music-sheet can be marked with the calls of any dance desired, the proper music being arranged by perforations on the sheet.

The driving-shaft can be connected with the roller L instead of the roller M, if desired; and on the pulley *p* of roller M is a crank-arm, *v*, (shown in Figs. 1 and 2,) which can be used to wind up the strip of paper on the roller M independent of the driving mechanism of the instrument.

What we claim as our invention, and desire to secure by Letters Patent, is—

1. The combination, with a mechanical musical instrument, of a music-roller and a take-up roller arranged outside and opposite the ends of said instrument in bearings unconnected with said instrument, substantially as specified.

2. The combination, with a mechanical musical instrument, of an attachment provided with a music-roller and a take-up roller, between which the said instrument is supported, the said instrument being readily removable from said attachment.

3. The combination, with a mechanical musical instrument, of a music-sheet controlling its operation, a music-roller and a take-up roller arranged opposite each other outside the case of the instrument, a driving-shaft, and means through which said take-up roller is operated from said shaft, substantially as specified.

4. The stand C, having standards N at each end and an intermediate space adapted to receive the instrument A in such position that a strip of paper may pass from a reel on one pair of said standards and connect with a reel on the other pair of standards, substantially as specified.

5. In a mechanical musical instrument, the combination of sound-producing devices, bellows for operating the same, a music-sheet for controlling their operation, a feed-roller for imparting motion to the music-sheet, a shaft with cranks set at different angles connected to the bellows, and pitman-rods connecting the feed-roller with the said shaft at each end of said shaft, substantially as specified.

6. In a mechanical musical instrument, the combination of sound-producing devices, bellows for operating the same, a music-sheet for controlling their operation, a feed-roller for imparting motion to the music-sheet, a shaft connected to the bellows, pitman-rods passing through slots in the top board of the instrument and connecting the feed-roller with the said shaft, substantially as specified.

7. In a mechanical musical instrument, the combination of sound-producing devices, bellows for operating the same, a music-sheet for controlling their operation, a feed-roller for imparting motion to the music-sheet, a shaft connected to the bellows, a pitman-rod extending through a slot in the top board of the instrument connecting the feed-roller with said shaft, and a bearing for said feed-roller outside the said slot, substantially as specified.

8. In combination with the driving-shaft of the feed or draw rollers of a mechanical musical instrument, A, in which a strip of perforated paper is used, one or more pitman-rods connected to a crank or cranks on said shaft, a secondary rotary shaft connected by cranks with said pitman-rods and provided with crank-bends connected by suitable links or pitmen with all the exhausters of the bellows of the instrument, substantially as and for the purpose set forth.

9. A strip of paper having perforations arranged so as to represent a quadrille, Lancers, &c., having marked or printed thereon the calls or figures belonging to said quadrille, Lancers, &c., at the proper places for the same to be called when said strip of paper has a mark or a line, &c., in combination with an indicator, S, located on a mechanical musical instrument, substantially as and for the purpose described.

GEO. B. KELLY.
MASON J. MATTHEWS.

Witnesses as to signature of G. B. Kelly:
EDWIN W. BROWN,
WILLIAM S. BELLOWS.

Witnesses as to signature of M. J. Matthews:
CHARLES H. HOLDEN,
T. J. KEANE.